Dec. 10, 1940.         A. O. PRICE         2,224,694
AUTOMATIC DUSTPAN
Filed Nov. 4, 1939
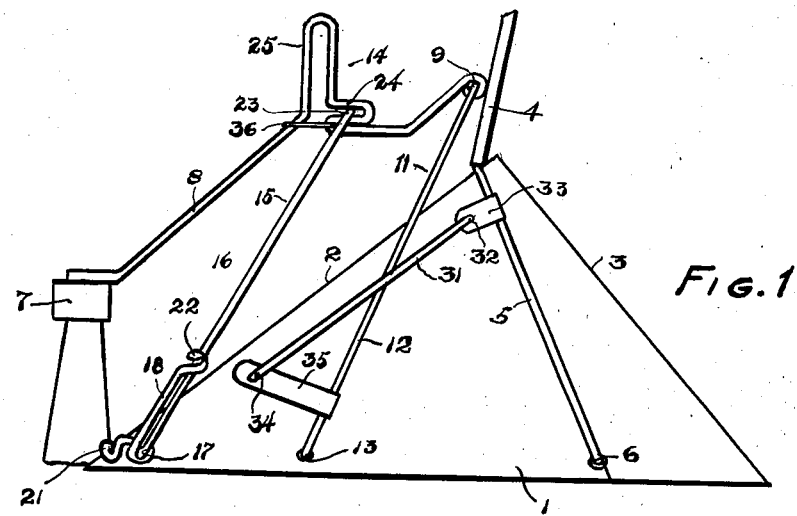
Fig. 1
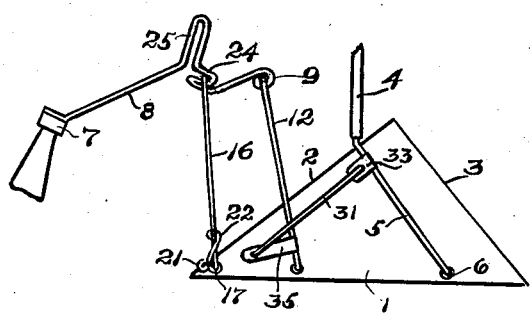
Fig. 3
Fig. 4
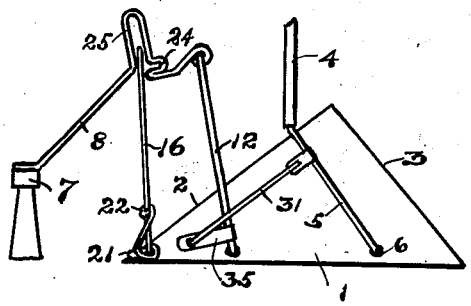
Fig. 2
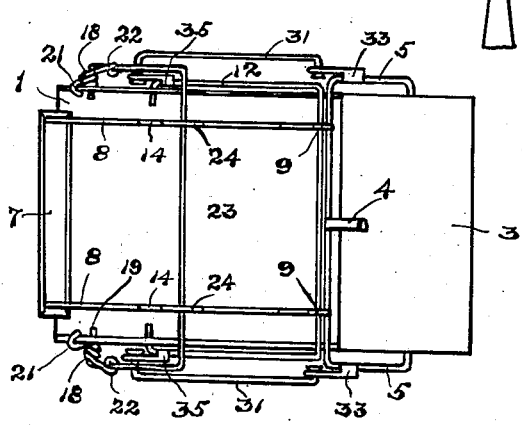
ALBERT O. PRICE,
INVENTOR.
BY
Saywell & Wesseler,
ATTORNEYS.

Patented Dec. 10, 1940

2,224,694

UNITED STATES PATENT OFFICE 2,224,694

AUTOMATIC DUSTPAN

Albert O. Price, Leesville, Ohio, assignor to William J. Wesseler, East Cleveland, Ohio Application November 4, 1939, Serial No. 302,896

15 Claims. (Cl. 65—62)

This invention, as indicated, relates to an automatic dustpan. More particularly, it comprises a receptacle having a material-moving member cooperating therewith to transfer material in relation to such receptacle. The device, as illustrated, is applied to a pan and brush member whereby litter in the form of scraps of paper and fragments of cigars and cigarettes and the like may be swept from a floor into the pan through the movement of the handle thereof. The device has a great many uses, and in some forms may be used on a table to remove crumbs, or it may be designed to feed material upon the movement of the handle from the pan onto a surface or other point of deposit.

It is common practice in hotels, stores, and various places of public character where litter is tossed upon the floor, to have porters carry around dustpans and a small broom and continuously gather up such debris so as to have the premises free of such accumulations. It not infrequently happens that the use of a broom with an independent handle is awkward in view of the position of furniture or other articles, and that the brushing of such articles into the pan must be carried on through a series of movements. With the present device, the brush is mounted on the pan and the placing of the pan in line with the articles to be removed is all that is required to insure their being properly projected into the pan through the operation of the brush upon the movement of the handle of the device.

The principal object of the present invention is to provide an improved device for handling material whereby the material is deposited upon or removed from a receptacle by means actuated by the handle of the receptacle.

Another object of the invention is to provide an inexpensive combination pan and brush so related to each other as to move said brush or similar element relatively to said pan along a predetermined path of movement whereby material may be moved into the pan or discharged therefrom in accordance with the movement of such element.

Another object of the invention is to provide a combination pan and brush, such pan being provided with a handle and means associated therewith to give accelerated movement in multiplied ratio to the brush along a predetermined path of travel, whereby material will be swept into the pan at high speed.

Another object of the invention is to provide a combination pan and brush having a handle for transporting the device from place to place, said handle also serving, when the pan is in a position of rest, to bring about automatically increased movement of the brush along a predetermined path of movement, so that material may be swept into the pan at a greatly accelerated movement of the brush and relatively very slight movement of the handle.

A further object of the invention is to provide a pan having a movable brush associated therewith, and having means for moving said brush along an elevated path of movement away from such pan and along a lowered path of movement toward such pan, whereby material may be moved into such pan.

A further object of the invention is to provide a device for collecting material from a surface and having a pan adapted to be placed on such surface and having a brush associated therewith, such brush being adapted to be actuated at a greatly accelerated rate and distance of movement over the rate and distance of movement of the actuating element, whereby material may be removed from such surface into the pan.

Other and further objects of the invention will appear in the course of the following description.

To the accomplishment of the foregoing and related ends, said invention, then, consists of the means hereinafter fully described and particularly pointed out in the claims, the annexed drawing and the following description setting forth in detail certain mechanism embodying the invention, such disclosed means constituting, however, but several of various forms in which the principle of the invention may be used.

In said annexed drawing:

Figure 1 is a side elevation of a device embodying the principles of the invention;

Figure 2 is a top plan view of the structure shown in Figure 1;

Figure 3 is a view similar to Figure 1, showing the brushing element raised and in the course of movement away from the pan; and Figure 4 is a view similar to Figures 1 and 3, showing the brushing element lowered and in the course of movement toward the pan.

The device as shown in Figure 1 comprises a receptacle or pan 1 having an open forward portion 2 and a closed rearward portion 3, and provided with a handle 4 having a pair of terminal arms 5 preferably formed of heavy wire and engaged at their respective lower ends with apertures 6 in the opposite sides of the receptacle toward the rearward portion of the sides of the pan. The brush 7 is normally held adjacent the forward edge of the pan and is supported upon a pair of arms 8 secured to the respective ends of the brush and extending rearwardly in parallel relation, the free ends of said arms being provided with eyes 9 engaging over the horizontal section of a lever member 11 of inverted U-shape having downwardly extending arms 12 engaging at their lower ends through apertures 13 positioned adjacent the forward central portion of the sides of the pan. The intermediate portions of the supporting arms 8 are bent upwardly and then rearwardly to provide a cam member 14 to produce arcuate movement of the brush upon the forward movement of the handle and horizontal movement of the brush upon the rearward movement of the handle. The cam member cooperates with a link 15 of inverted U-shape similar to the lever 11, having downwardly extending arms 16 engaging at their lower ends through apertures 17 positioned adjacent the forward portion of the sides of the pan.

Light wire springs 18 are wound about the inwardly turned portions 19 at the lower ends of the arm and have one free end 21 engaged over the adjacent edge of the pan and the other free end 22 engaged over the arm 16, said springs thus applying a suitable amount of pressure upon the link 15 to normally hold it in rearward position, such as is shown in Figure 1, with the horizontal portion 23 of said link engaged within the rearward portion 24 of the cam member 14 which includes the upwardly extending cam section 25 as well as the rearwardly extending cam section 24.

Movement is imparted to the link and lever system just described from the handle 4 and its terminal arms 5 by means of the respective links 31, each of said links being engaged at one end through an aperture 32 in a plate 33 rigidly secured to the upper portion of the respective terminal arms 5, and is engaged at its lower end through an aperture 34 in the end of a plate 35 rigidly secured at its opposite end to the lower portions of the downwardly extending arms 12 of the lever member.

Through the link and lever system just described, forward movement of the handle 4 will cause a forward and upward movement of the brush 7. The brush will move through an arcuate path at a greater rate of movement than the handle because of the lever system employed, and will cause the lower portion 24 of the cam member 14 to assume an upward inclination, as clearly shown in Figure 3, which will cause the horizontal portion of the link member 15 to be freed from supporting relation to the supporting bar 8 as the horizontal portion 23 moves forwardly into line with the upper section 25 of the cam member. When this position is reached, the supporting arm 8 will drop in the manner shown in Figure 4, the brush 7 coming in contact with the surface in advance of the front edge of the pan. As the handle is moved rearwardly, the brush will be drawn sharply backward, and when the parts resume the position shown in Figure 1, the horizontal portion 23 of the link 15 will again be seated within the rearward section 24 of the cam member. If desired, a loop of wire 36 may be engaged across the lower portion of the cam section of each supporting bar so as to prevent accidental displacement of the horizontal portion 23 of the link 15 from such cam area.

It will be understood that if material was to be discharged from the pan, the operating elements for the elevating and lowering of the brush would have to be reversed in position.

Various types of linkage other than that above set forth may be utilized, so long as the purpose of the apparatus is accomplished of providing a a compact supporting means having a wide range of action whereby the brush may be moved forward at a great distance by mechanism having relatively small height and thus being free of interference in moving beneath chairs and other objects affording small clearance.

Other modes of applying the principle of my invention may be employed instead of those explained, change being made as regards the mechanism herein disclosed, provided the means stated by any of the following claims or the equivalent of such stated means be employed.

I therefore particularly point out and distinctly claim as my invention:

1. An apparatus of the character described having in combination, a receptacle, a material-moving element operatively connected with said receptacle by linkage, and means mounted on said receptacle for moving said receptacle and said material-moving element selectively.

2. An apparatus of the character described having in combination, a receptacle, a material-moving element operatively connected with said receptacle by linkage, and unitary means mounted on said receptacle for moving said receptacle and said material-moving element selectively.

3. An apparatus of the character described having in combination, a receptacle, a material-moving element operatively connected with said receptacle, a handle for said receptacle, and linkage means for operating said material-moving element connected with said handle.

4. An apparatus of the character described having in combination, a receptacle, a material-moving element operatively connected with said receptacle, a handle for said receptacle, and linkage means for operating said material-moving element connected with said handle and moving said element at high speed.

5. An apparatus of the character described having in combination, a receptacle, a material-moving element operatively connected with said receptacle, a handle for said receptacle, and multiple leverage means for operating said material-moving element connected with said handle and moving said element with multiplied acceleration.

6. An apparatus of the character described having in combination, a receptacle adapted to be rested on a surface to be operated on, a material-moving element operatively connected with said receptacle, and linkage means for moving said material-moving element in one direction along an elevated path of movement spaced from said surface and in the opposite direction along a lower path of movement in contact with said surface.

7. An apparatus of the character described having in combination, a receptacle, a material-moving element operatively connected with said receptacle, and linkage means for moving said material-moving element along an arcuate path of movement in a direction away from said receptacle and along a substantially straight path of movement in a direction toward said receptacle.

8. An apparatus of the character described having in combination, a receptacle adapted to be rested on a surface to be operated on, a material-moving element operatively connected with said receptacle, and multiple leverage operating means for moving said material-moving element in one direction along an elevated path of movement spaced from said surface, and in the opposite direction along a lower path of movement in contact with said surface, said material-moving element being caused to move at an accelerated rate of movement in each direction.

9. An apparatus of the character described having in combination, a receptacle, a handle extending upwardly from said receptacle, a material-moving element operatively connected with said receptacle, and linkage means operatively connected with said handle for moving said material-moving element in an upward and outward direction in relation to said receptacle, lowering said material-moving element to a lower position and moving said element inwardly toward said receptacle in such lowered position.

10. An apparatus of the character described having in combination, a receptacle, a handle extending upwardly from said receptacle, a material-moving element operatively connected with said receptacle, and linkage means operatively connected with said handle for moving said material-moving element in an upward and outward direction in relation to said receptacle, releasing said material-moving element to a lower position, and thereafter moving said element inwardly toward said receptacle in such lowered position.

11. An apparatus of the character described having in combination, a dustpan open at its forward edge and having a hooded rearward portion, a material-moving element, means movably connecting said element with said dustpan, a handle connected with said dustpan and having an elongated substantially vertical section, and a pair of cooperating cam members associated with said handle and said connecting means for said material-moving element for moving said material-moving element along an arcuate path of movement in one direction in relation to said dustpan and along a substantially straight path of movement in the opposite direction in relation to said dustpan.

12. An apparatus of the character described having in combination, a receptacle, a material-moving element, means movably connecting said material-moving element with said receptacle, a handle for said receptacle, means on said handle and said connecting means for causing said element to move at an elevated position in one direction, and means for causing said element to move in a lowered position in a reverse direction.

13. An apparatus of the character described having in combination, a dustpan, a brush, a supporting element for said brush extending rearwardly and movably connected with said dustpan, an elevating member provided on said supporting element, a handle connected with said dustpan, and means connected with said handle to bring about the operation of said elevating member upon the movement of said handle.

14. An apparatus of the character described having in combination, a dustpan, a brush, a supporting element for said brush extending rearwardly and movably connected with said dustpan, an elevating member provided on said supporting element, a handle connected with said dustpan, and multiple leverage means connected with said handle to bring about the greatly accelerated operation of said elevating member upon the movement of said handle.

15. An apparatus of the character described having in combination, a dustpan, a brush, a supporting element for said brush extending rearwardly and movably connected with said dustpan, a cam member provided on said supporting element, a handle connected with said dustpan, means for engaging said cam member, and multiple leverage means mounted on said handle adapted to produce a multiplied rate of movement of said brush with reference to said handle and to bring about engagement and release of said cam and cam-engaging member upon the movement of said handle.

ALBERT O. PRICE.